United States Patent [19]

Casals et al.

[11] 4,362,488
[45] Dec. 7, 1982

[54] EXTRUDER FOR CONTINUOUS MANUFACTURE OF REINFORCED TUBING, ESPECIALLY HOSE

[76] Inventors: Ramon R. Casals; Jaime R. Casals, both of Canarias, 23, Barcelona, Spain

[21] Appl. No.: 243,060

[22] Filed: Mar. 9, 1981

[30] Foreign Application Priority Data

Mar. 12, 1980 [ES] Spain ................................. 489.439

[51] Int. Cl.$^3$ ............................................. B29D 23/05
[52] U.S. Cl. ................................. 425/113; 264/173; 264/174; 264/209.8; 425/114; 425/133.1; 425/379 R; 425/380; 425/462; 425/467
[58] Field of Search ..................... 425/113, 114, 133.1, 425/378 R, 379 R, 131.1, 380, 467, 462; 264/173, 174, 209.8

[56] References Cited

U.S. PATENT DOCUMENTS

| | | | |
|---|---|---|---|
| 2,767,431 | 10/1956 | De Laubarede | 264/173 |
| 2,990,577 | 7/1961 | De Laubarede | 425/114 |
| 3,183,135 | 5/1965 | Berquist | 264/173 |
| 3,191,230 | 6/1965 | Ashton | 425/113 |
| 3,418,404 | 12/1968 | Hird | 264/173 |
| 3,905,853 | 9/1975 | Stent | 264/173 |
| 4,161,379 | 7/1979 | Sudyk | 425/133.1 |

*Primary Examiner*—Jeffery R. Thurlow
*Attorney, Agent, or Firm*—Michael J. Striker

[57] ABSTRACT

An extruder for continuously manufacturing reinforced fluid-impermeable tubing, especially hose, mainly comprises an elongated extruder head formed from an inner, an intermediate and an outer tubular member arranged concentric with each other and constructed to define between the inner and the intermediate tubular members a first annular passage having an outlet end communicating at an opposite end thereof with a first hopper, and to define between the intermediate and the outer tubular member a second annular passage communicating with a second hopper. A mandrel concentric with the inner tubular member forms a gap with the latter through which a tubular reinforcing fabric is guided. The mandrel is provided with an annular neck which overlaps at least partly the outlet end of the first annular passage; which is rearwardly displaced from the outlet end of the second annular passage so that compounded polymeric material passing from the first hopper to the outlet end of the first annular passage may pass through a portion of the tubular fabric reinforcement not yet covered at its outer surface to form an inner layer of the reinforced tubing, while the material passing from the second hopper to the outlet end of the second annular passage will form the outer layer of the reinforced tubing.

6 Claims, 10 Drawing Figures

4,362,488

EXTRUDER FOR CONTINUOUS MANUFACTURE OF REINFORCED TUBING, ESPECIALLY HOSE

BACKGROUND OF THE INVENTION

The present invention relates to extruders for the manufacture of reinforced tubing consisting of a tubular fabric reinforcement, an outer tubular layer of compounded polymeric material applied to the outer surface of the tubular fabric reinforcement and an inner tubular layer of compounded polymeric material applied to the inner surface of the tubular fabric reinforcement.

Such extruders are known in the art and for instance disclosed in the Spanish Pat. Nos. 246,817 to Leonce Marie Henri Kraffe de Lanbaregi and 338,021 to Jaime Ribo Batlle. However, the extruders respectively disclosed in the aforementioned patents have a number of disadvantages, among which may be mentioned that it is not possible to work with different materials for the inner and outer layers of the tubing, the output obtained from the construction of these known patents is rather small, and it is not possible to control the temperature of the compounded polymeric material forming the inner and the outer layer of the tubing during the passage through the extruder.

SUMMARY OF THE INVENTION

It is an object of the present invention to provide an extruder for continuously manufacturing reinforced tubing of the aforementioned kind which avoids the disadvantages of such extruders known in the art.

It is a further object of the present invention to provide an extruder for continuously manufacturing reinforced tubing in which the outer tubular layer of compounded polymeric material may be formed from different material than the inner tubular layer of compounded polymeric material.

It is an additional object of the present invention to provide an extruder of the aforementioned kind which is composed of relatively few and simple parts so that the extruder may be manufactured at reasonable cost and stand up properly under extended use.

With these and other objects in view, which will become apparent as the description proceeds, the extruder according to the present invention for continuously manufacturing reinforced tubing, especially hose, consisting of a tubular fabric reinforcement, an outer tubular layer of compounded polymeric material applied to the outer surface of the tubular fabric reinforcement and an inner tubular layer of compounded polymeric material applied to the inner surface of the tubular fabric reinforcement, in which the extruder mainly comprises an elongated extruder head having a plurality of tubular means arranged to form two main annular passages extending in longitudinal direction of said head and each having an inlet end and an outlet end, in which one of said main annular passages is at least in part surrounded by the other main annular passage, and in which the one annular passage serves for the flow of compounded polymeric material therethrough forming the inner tubular layer and the other of the annular passages serves for the flow of compounded polymeric material therethrough forming the outer tubular layer. The outlet end of the one annular passage being rearwardly displaced, as considered in the direction of the flow of compounded polymeric material from the outlet end of the other annular passage. The extruder comprises further first hopper means communicating with the inlet end of the one annular passage for feeding compounded polymeric material for forming the inner tubular layer into the one annular passage and a second hopper communicating with the inlet end of the other annular passage for feeding compounded polymeric material for forming the outer tubular layer into the other annular passage. The extruder head is further provided with a central passage of circular cross section therethrough and a mandrel of circular cross section of a diameter smaller than that of said central passage extends coaxially through the central passage to form an annular gap with the latter for guiding the tubular fabric reinforcement through this annular gap. The mandrel is provided in the region of the outlet end of the one annular passage with an annular neck at least partly overlapping the outlet end of said one annular passage so that the material passing through the one annular passage may penetrate through the fabric reinforcement to form the inner tubular layer of compounded polymeric material applied to the inner surface of the tubular reinforcement.

The plurality of tubular means comprise inner tubular means, intermediate tubular means and outer tubular means arranged preferably coaxial with each other and the mandrel and constructed to define between the inner tubular means and the intermediate tubular means said one annular passage and between the intermediate tubular means and the outer tubular means said other annular passage.

Each of the tubular means is provided with temperature-regulating passages for the flow of a temperature-regulating medium therethrough.

The first and the second hopper may be arranged equally spaced from opposite ends of the extruder head, or the first hopper may be further spaced in axial direction from the end of the extruder head through which the finished tubing is discharged than the second hopper.

The novel features which are considered characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DESCRIPTION OF THE PREFERRED EMBODIMENTS

The extruder according to the present invention serves to continuously manufacturing reinforced tubing, especially hose, comprising a tubular fabric reinforcement 1, an inner layer 2 of compounded polymeric material applied to the inner surface of the fabric reinforcement 1, and an outer layer 3 of compounded polymeric material applied to the outer surface of the fabric reinforcement 1.

Figure 1:
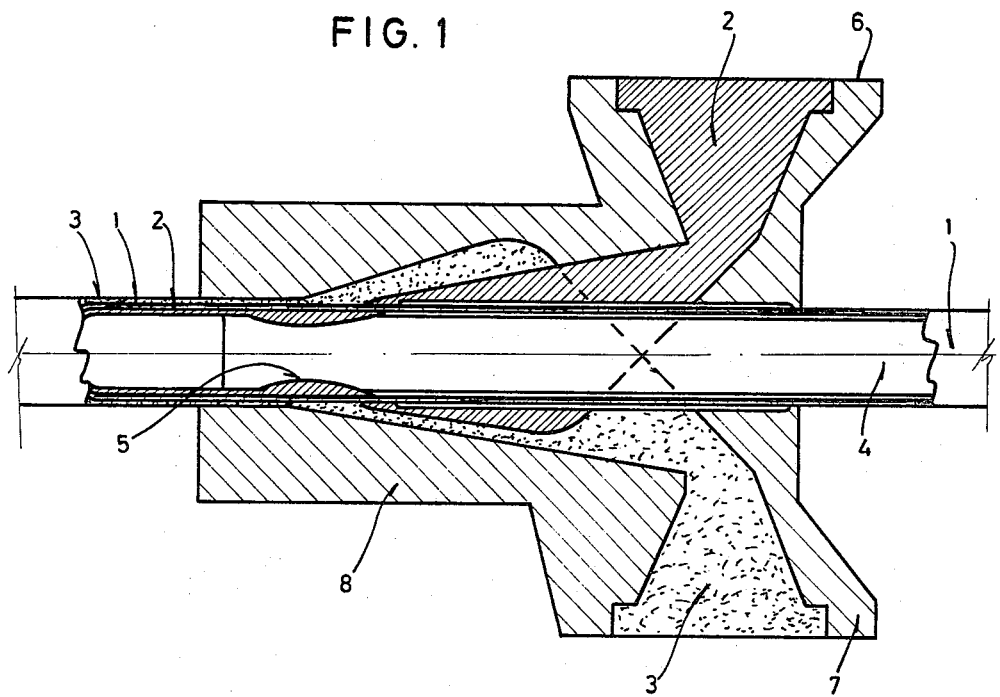
FIG. 1 is a schematic axial cross section through an extruder according to the present invention and illustrating its operating principle.

FIG. 1 schematically illustrates a first embodiment of an extruder according to the present invention, and as shown in FIG. 1 the extruder of the present invention may comprise an extruder head 8 formed with a central passage therethrough through which a mandrel 4 coaxially extends having a diameter smaller than that of the central passage to form a gap therewith through which the tubular fabric reinforcement 1 is passed. The compounded polymeric material 2 forming the inner layer of the reinforced tubing passes from a hopper 6 through an annular passage in the extruder head 8, whereas the material 3 for forming the outer layer passes from a second hopper 7 through an annular passage in the extruder head into the aforementioned gap. It will be noted from FIG. 1 that the outlet end of the one annular passage through which the first hopper 6 communicates with the aforementioned annular gap is displaced rearwardly, as considered in the direction of flow of compounded polymeric material, from the outlet end of the second annular passage through which the hopper 7 communicates with the aforementioned annular gap. An essential feature of the present invention is that the mandrel 4 is formed with an annular neck 5 which partly overlaps the outlet end of the annular passage through which the first hopper 6 communicates with the annular gap, so that the compounded polymeric material emanating from the first hopper 6 may penetrate through a portion of the tubular fabric reinforcement 1 which is not yet covered by the outer layer 3 to thus form the inner layer 2 of compounded polymeric material.

In the embodiment schematically illustrated in FIG. 1, the two hoppers 6 and 7 are equally spaced from opposite ends of the extruder head 8 and the two hoppers 6 and 7 may be aligned along a common axis normal to the longitudinal axis of the extruder head 8, or the two hoppers 6 and 7 may be circumferentially displaced through an angle less than 180°.

Figure 10:
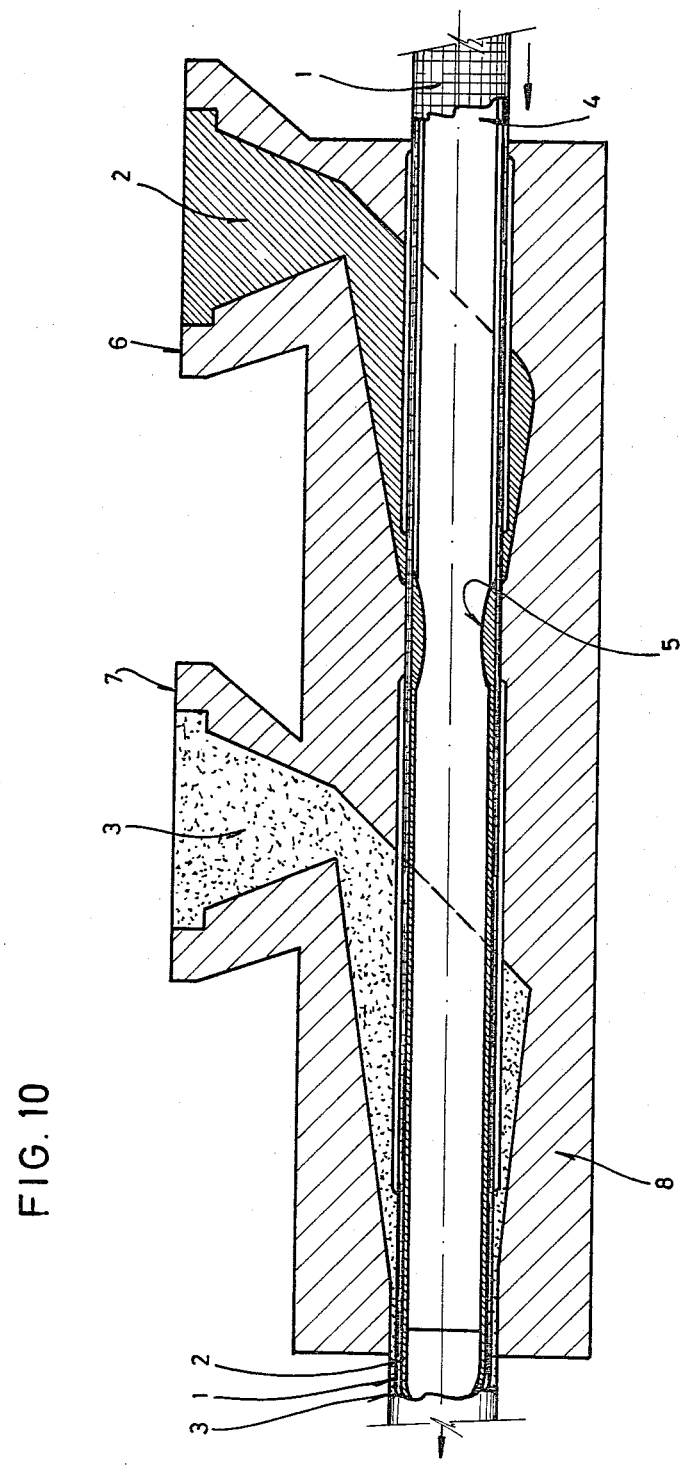
FIG. 10 is an axial cross section illustrating schematically a further embodiment according to the present invention differing from that schematically shown in FIG. 1 especially by a different arrangement of the two hoppers.

The embodiment schematically shown in FIG. 10 differs from that schematically shown in FIG. 1 in that the hopper 7 is displaced forwardly, as considered in the direction of movement of the fabric reinforcement through the extruder head 8, as indicated by the arrow with respect to the hopper 6, and correspondingly the outlet ends of the annular passages through which the compounded polymeric material from the hoppers 7 and 6 flows are likewise considerably displaced in axial direction as compared with the embodiment shown in FIG. 1. The mandrel 4 is again formed with a tubular neck 5 partly overlapping the outlet end of the tubular passage through which the material 2 forming the inner layer emanates so that the compounded polymeric material coming from the hopper 6 may penetrate through a portion of the fabric reinforcement 1 which is not yet covered by the outer layer 3 to thus form the inner layer 2.

It is to be understood that in all embodiments disclosed the hoppers 6 and 7 communicate at the outer ends thereof with means of standard construction, not shown in the drawing, for feeding compounded polymeric material under pressure into the hoppers 6 and 7.

Figure 3:
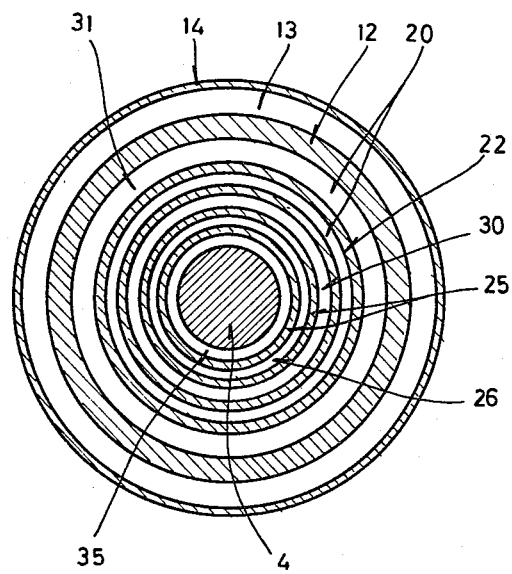
FIG. 3 is a cross section taken along the line III—III of FIG. 2.
Figure 2:
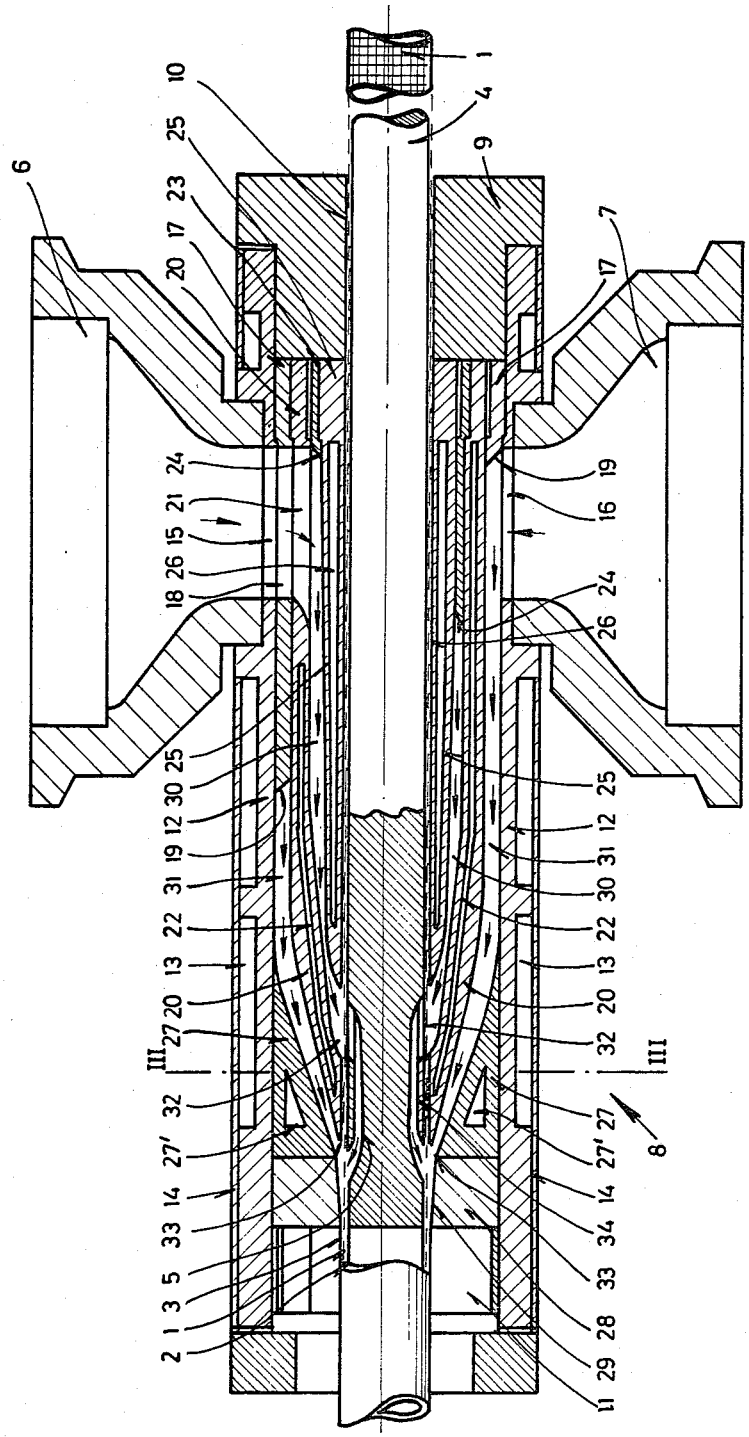
FIG. 2 is an axial cross section through a first embodiment of an extruder according to the present invention.
Figure 4:
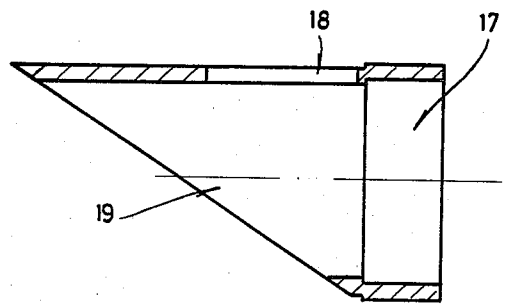
FIGS. 4–7 respectively illustrate axial cross sections through various elements of the embodiment shown in FIG. 2.
Figure 5:
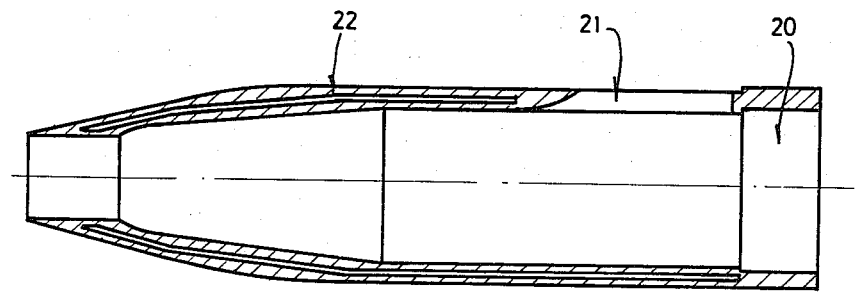
Figure 6:
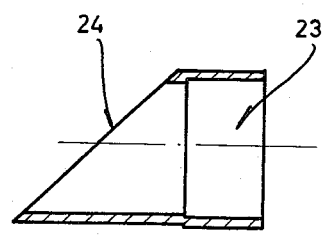
Figure 7:
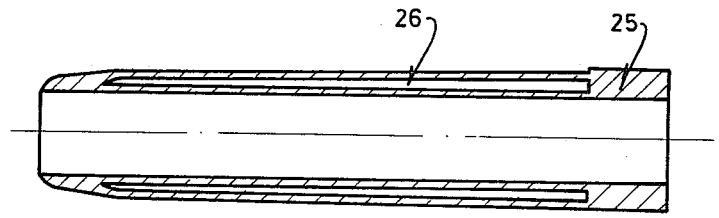

FIGS. 2-7 illustrate the actual construction of one embodiment of an extruder according to the present invention. As shown in FIGS. 2 and 3, this embodiment comprises an extruder head 8 substantially closed at one end by a plug-like member 9 formed with a central cylindrical opening 10 therethrough and an elongated mandrel 4 having a diameter smaller than the opening 10 extends through this opening and in longitudinal direction coaxially with the cylinder head 8 through and with opposite ends beyond the latter. The extruder head 8 further comprises an outer tubular member 12 formed at the outer surface thereof with interconnected grooves 13 closed at the outer ends by a cover 14 to form a passage for circulation of a temperature-regulating medium therethrough furnished from a source not shown in the drawing. Abutting against part of the inner surface of the outer tubular member 12 is a tubular spacer member 17 having a front face 19 inclined at an acute angle to the axis thereof, as best shown in FIG. 4 and forms with the outer tubular member 12 outer tubular means. An intermediate tubular member 20 abuts against the inner surface of the tubular spacer member and projects therefrom, to the left, as shown in FIG. 2, to form with the outer tubular member 12 an annular channel 31. Abutting against a portion of the right end, as viewed in FIG. 2, of the inner surface of the intermediate tubular member 20 is another tubular spacer member 23 having a front face 24 (FIG. 6) extending at an acute angle, but in opposite direction with respect to the front face 19 of the spacer member 17, to the axis of the extruder head 8, to form with the intermediate tubular member 20 intermediate tubular means. Abutting against the inner surface of the tubular spacer member 23 and projecting forwardly therefrom is an inner tubular member or inner tubular means 25 defining with the intermediate tubular member 20 an annular passage 30. The outer tubular member 12 is provided in the region of its rear end, that is the right end as viewed in FIG. 2, with a pair of openings 15 and 16 therethrough and the spacer member 17 and the intermediate tubular member 20 are respectively provided with openings 18 and 21 aligned with the opening 15 so that the passage 30 may communicate with the interior of a hopper 6 connected to the outer tubular member 12, whereas the second annular passage 31 communicates through the opening 16 in the outer tubular member 12 with the interior of a second hopper 7 likewise fixed to the outer tubular member 12. In the embodiment shown in FIG. 2, the two hoppers 6 and 7 are equally spaced from the outlet end of the extruder head 8. As clearly shown in FIG. 2 as well as in the FIGS. 5 and 7, the intermediate tubular member 20, as well as the inner tubular member 25, have each a cylindrical portion abutting against the plug 9 and a free end portion tapering towards the axis of the extruder head 8. The intermediate tubular member 20 is provided in the wall thereof with a passage 22 for circulation of a temperature-regulating fluid therethrough, while the inner tubular member 25 is provided in the wall thereof with a similar temperature-regulating passage 26 likewise provided for the flow of a temperature-regulating medium therethrough. The extruder head 8 further comprises an annular member or sleeve 28 abutting against the inner surface of the outer tubular member 12 in the region of its left end, as viewed in FIG. 2, and the central opening 29 in this annular member 28 has a larger diameter than the cylindrical opening 10 in the plug 9. An additional annular element 27 having an inner frustoconical surface abuts against the right end face, as viewed in FIG. 2, of the annular member 28 and completing the annular passage 31 towards the outer surface of the mandrel 4. The annular element 27 is likewise formed in the wall thereof with a passage 27' for the circulation of a temperature-regulating medium therethrough. As clearly shown in FIG. 2, the outlet end 32 of the annular passage 30 which communicates with the first hopper 6 is rearwardly displaced, as considered in the direction of flow of material therethrough with respect to the outlet end 33 of the annular passage 31 which communicates with the second hopper 7. The mandrel 4 is formed with an annular neck 5 overlapping at least partly the outlet end 32 of the annular passage 30 and extending from there into the region of the outlet end 33 of the annular passage 31. A thin-walled annular member 34 extends spaced from the outer surface of the neck 5 along the cylindrical inner wall portion of the intermediate tubular member 20 between the outlet end 32 of the annular passage 30 and the outlet end 33 of the annular passage 31 to form a gap with this inner cylindrical wall surface. The left end of the mandrel 4 extends with ample clearance through a thin-walled sleeve abutting against the inner surface of the outer tubular member 12 in the region of the left end thereof and through an end member connected through the left end of the tubular member 12. The various tubular members and the annular element 27 may be connected to the plug 9 and the annular member 28 in any suitable manner not shown in the drawing.

The above-described embodiment of the extruder according to the present invention may be operated as follows:

The tubular fabric reinforcement 1 is continuously fed along the outer surface of the mandrel 4 and simultaneously compounded polymeric material under pressure is fed from the hopper 6 through the annular passage 30 to pass from the outlet end 32 of the this annular passage through the interstices of the tubular reinforcing fabric and through the channel formed between the neck 5 and the thin-walled tubular member 34 to form the inner layer 2, whereas compounded polymeric material under pressure from the hopper 7 passes at the same time through the annular passage 31 and through the outlet end 33 of the latter to form the outer layer 3 applied to the outer surface of the fabric reinforcement 1. The thus finished reinforced tubing passes through the clearance between the mandrel 4 and the inner surface of the annular member 28 out of the extruder. The material for the outer layer 3 and the inner layer 2 may be the same or different materials may be used for the inner and the outer layer. Various examples of materials to be used are given further below.

Figure 8:
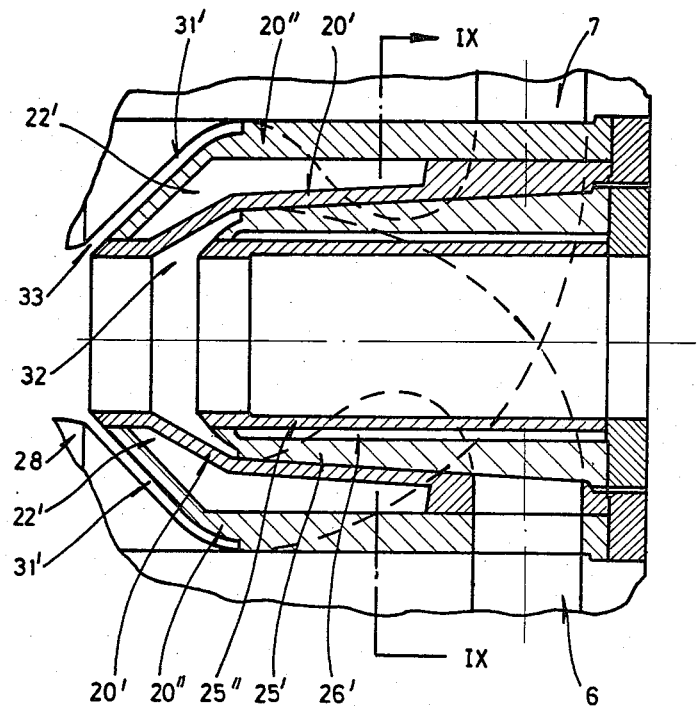
FIG. 8 is an axial cross section through part of an extruder head of a second embodiment.
Figure 9:
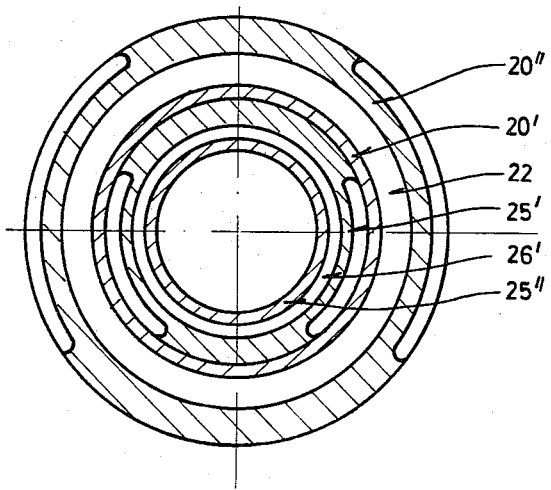
FIG. 9 is a cross section taken along the line IX—IX of FIG. 8.

FIGS. 8 and 9 partly illustrate another embodiment of an extruder head according to the present invention in which the mandrel 4 is omitted and the hoppers 6 and 7 as well as the outer tubular member 12 are only partly illustrated.

The embodiment in FIGS. 8 and 9 again includes an intermediate tubular member formed in this case of two parts 20' and 20" defining between themselves a passage 22' for the circulation of a temperature-regulating fluid therethrough, whereas the inner tubular member is likewise formed of two parts 25' and 25" again defining between themselves an annular passage 22' for circulation of a heat temperature regulating medium therethrough. The hopper 6 communicates with the annular outlet 32 for the formation of the inner layer through a passage indicated in dotted lines in FIG. 8, whereas the hopper 7 communicates with the outlet 33 for the formation of the outer layer through an annular passage 31' partly shown in dotted lines in FIG. 8. It is to be understood that the arrangement shown in FIG. 8 includes also a mandrel 4, as shown in FIG. 2, provided with a neck 5 and a thin-walled annular member 34, as shown in FIG. 2, so that the compounded polymeric material coming from the hopper 6 will pass through the outlet end 32 through an uncovered fabric reinforcement 1 fed along the mandrel 4 to thus form the inner layer 2, whereas the material coming from the hopper 7 will pass through the outlet end 33 of the annular passage 31' to form the outer layer of the reinforced tubing.

In both embodiments the entire extruder head is maintained throughout the extrusion operation at proper temperature by a temperature-regulating medium circulated through the passages formed in the walls of the various tubular elements to assure thereby that the compounded polymeric material forming the inner and the outer layer will be connected and properly bonded to the fabric reinforcement.

The embodiment shown schematically in FIG. 10 is operated substantially in the same manner. The material 2 for forming the inner layer will pass from the hopper 6 through an uncovered fabric reinforcement 1 continuously fed along the mandrel 4 and through the neck 5 of the mandrel to form the inner layer 2 of compounded polymeric material, whereas the outer layer 3 will be formed subsequently thereto from the material 3 passing from the mandrel 7 onto the outer surface of the fabric reinforcement 1, the inner surface having already been covered by the inner layer 2.

Various suitable polymeric compounds such as elastomers, rubbers, thermoplastics, thermoplastic rubbers, and the like, may be used for forming the inner layer 2 and the outer layer 3. The above materials can be used compounded and sometimes pure. By way of example, some of the numerous materials which can be used for this purpose are listed below.

| Inner layer | | Outer layer | |
|---|---|---|---|
| NBR-PVC 70/30 | 100 | Neoprene | 100 |
| Sulphur | 2 | Magnesium oxide | 4 |
| Precipitated silica | 28 | Precipitated silica | 25 |
| Activator | 1 | | |
| Stearic acid | 1 | Stearic acid | 1 |
| Zinc oxide | 5 | Zinc oxide | 5 |
| Plasticizer | 30 | Plasticizer | 10 |
| Non-reinforcing filler | 20 | Non-reinforcing filler | 10 |
| Wax | 2 | Wax | 2 |
| Antioxidant | 2 | Antioxidant | 2 |
| Antiozonizer | 2 | Antiozonizer | 2 |
| Accelerators | 2 | Accelerators | 2 |
| Pigment | as needed | Pigment | as needed |

On the other hand, a thermoplastic of a composition as listed below may be used for both layers.

| | |
|---|---|
| PVC | 100 |
| Plasticizer | 50 |
| Stabilizers | 3 |

-continued

| | |
|---|---|
| Waxes | 0.1 |
| Stearic acid | 0.1 |
| Pigment | as needed |
| Filler | 20 |

The extruder according to the present invention has many advantages as compared with such extruders known in the art. Thus, for instance, the inner and the outer layer of the reinforced tubing may be formed from materials having different properties and different colors; depending on the diameter of the mandrel 4 and the inner diameter of the elements surrounding the same, the thickness of the inner layer may be different from the thickness of the outer layer; materials until now not usable for the manufacture of reinforced tubing may be employed; finally, higher processing speeds and precise control of the temperature passing through the extruder of the present invention may be achieved.

It will be understood that each of the elements described above, or two or more together, may also find a useful application in other types of extruders for continuously manufacturing reinforced tubing, especially hose, differing from the types described above.

While the invention has been illustrated and described as embodied in an extruder for continuously manufacturing reinforced tubing consisting of a tubular fabric reinforcement, an outer tubular layer of compounded polymer material applied to the outer surface of the tubular fabric reinforcement, and an inner tubular layer of compounded polymer material applied to the inner surface of the tubular fabric reinforcement, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. An extruder for continuously manufacturing of reinforced tubing, especially hose, consisting of a tubular fabric reinforcement, an outer tubular layer of compounded polymeric material applied to and bonded to the outer surface of the tubular fabric reinforcement and an inner tubular layer of compounded polymeric material applied to and bonded to the inner surface of the tubular fabric reinforcement, said extruder comprising an elongated extruder head having a plurality of tubular means arranged to form two main annular passages extending in longitudinal direction of the head and each having an inlet end and an outlet end, one of said main annular passages being at least in part surrounded by the other main annular passage, said one annular passage serving for the flow of compounded polymeric material therethrough forming said inner tubular layer and the other of said annular passages serving for the flow of compounded polymeric material therethrough forming said outer tubular layer, said outlet end of said one annular passage being rearwardly displaced, as considered in the direction of flow of the compounded polymeric material, from the outlet end of said other annular passage; a first hopper communicating with the inlet end of said one annular passage for feeding compounded polymeric material for forming said inner tubular layer into said one annular passage; a second hopper communicating with the inlet end of said other annular passage for feeding compounded polymeric material for forming said outer tubular layer into said other annular passage; said extruder head being further provided with a central passage of circular cross section therethrough; and a mandrel of circular cross section of a diameter smaller than that of said central passage extending coaxially through said central passage to form an annular gap with the latter for feeding the tubular fabric reinforcement through said annular gap, said outlet end of said one annular passage and said outlet end of said other annular passage terminate both at the outer periphery of said annular gap, said mandrel being provided in the region of the outlet end of said one annular passage with an annular neck at least partly overlapping said outlet end of said one annular passage.

2. An extruder as defined in claim 1, wherein said plurality of tubular means comprise inner tubular means, intermediate tubular means and outer tubular means arranged coaxially with each other and said mandrel, said tubular means being arranged and constructed to define between said inner tubular means and said intermediate tubular means said one main annular passage and between said intermediate tubular means and said outer tubular means said other main annular passage.

3. An extruder as defined in claim 2, wherein each of said tubular means is provided in the wall thereof with temperature-regulating passages for the flow of a temperature-regulating medium therethrough.

4. An extruder as defined in claim 2, wherein said inner and said intermediate tubular means have each a cylindrical portion extending from the respective hopper towards the outlet end of the respective main annular passage and a radially inwardly tapering end portion in the region of the respective outlet end.

5. An extruder as defined in claim 1, wherein said extruder head has an end through which the finished tubing is discharged, and wherein said first and said second hoppers are equally spaced from said end of said extruder head.

6. An extruder as defined in claim 1, wherein said extruder head has an end through which the finished tubing is discharged, and wherein said first hopper is further spaced in axial direction from said one end of said extruder head than said second hopper.

* * * * *